April 22, 1969

G. A. JENSEN 3,440,079

SPRAY COATING

Filed Feb. 10, 1965

GERALD A. JENSEN
INVENTOR.

BY *Alden D Redfield*
*Abraham Ogman*
ATTORNEYS

United States Patent Office 3,440,079
Patented Apr. 22, 1969

3,440,079
SPRAY COATING
Gerald A. Jensen, Lowell, Mass., assignor to Avco Corporation, Cincinnati, Ohio, a corporation of Delaware
Filed Feb. 10, 1965, Ser. No. 431,596
Int. Cl. B44d 1/97
U.S. Cl. 117—22                4 Claims

ABSTRACT OF THE DISCLOSURE

The invention is directed to means for and method of depositing a composite coating comprising a matrix with particle inclusions on a substrate. The composite coating is formed by spraying a tube of material to an apparatus capable of melting and atomizing the tube and spraying the molten particles on a substrate. The particle inclusions in the composite are supplied through the passage of the tube and combined with the atomized particles and simultaneously sprayed to the substrate. Any combination of meltable tubing and heat resistant particles may be used.

---

Figure 1:
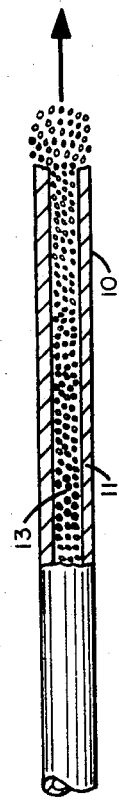

This invention relates to improvements in spray coating procedures and particularly to methods of depositing a composite coating comprising a matrix material having dispersed therein discontinuous, modifying particles.

Composite coatings of the type described above have been made by a number of processes. In the welding art, welding rods formed from tubes filled with particulated material have been used. Where it was desired to provide a hard facing, a steel tube containing silicon carbide or tungsten carbide particles was used as the welding rod.

In flame-spraying procedures, a composite rod containing two or more materials has also been used, including the tubes containing fixed quantities of particles.

A limitation in both of the aforementioned procedures is the inability of the user to vary or control the relative amounts of matrix material and particle material; the proportions of matrix and particle material is determined by the composition of the rods used. The cost of composite rods is another limitation since special filling equipment and/or techniques are used in their fabrication. Additionally, the volume of particles that may be stored in a tube is known to be limited by the volume of the tube passage. As a practical matter, much less than the theoretical maximum volume is achieved.

It is an object of the invention to provide spray coating procedures which avoid the limitations and disadvantages of prior art procedures.

It is another object of the invention to provide a spray coating procedure for depositing a composite coating which enables an operator to control the relative proportions of matrix material and particle material deposited.

It is yet another object of the invention to provide a spray coating procedure for depositing a composite coating which is compatible with existing flame-spraying and plasma-spraying equipments.

It is still another object of the invention to provide spray coating procedures for depositing composite material wherein the matrix material is supplied in the form of a tube, and the particle material is fed through the tube independently of feed rate of the tube.

It is still another object of the invention to provide spray coating procedures for depositing a composite material wherein a matrix material and particle material are fed continuously to spray coating equipment, the matrix material being supplied in the form of a tube, and the particle material being supplied through the tube in a fluidized stream.

It is yet another object of the invention to provide an apparatus for depositing a composite coating by feeding matrix material in the form of a tube and feeding particle material through the tube to a spray coating device, the feed rates of the tube and the particle materials being independently controllable.

It is yet another object of the invention to provide an apparatus as described in the foregoing paragraph in which the particles are fed in a fluidized stream flowing through the tube.

In accordance with the invention, a method of forming a composite coating comprises continuously feeding a tube of a first material to a spraying apparatus, i.e., flame-spraying or plasma-spraying apparatus. The method also includes continuously feeding particles of a second material independently of the feed rate of said tube through said tube to the spraying apparatus. Both the matrix material and the particles are deposited simultaneously as a sprayed mixture on a substrate.

Figure 2:
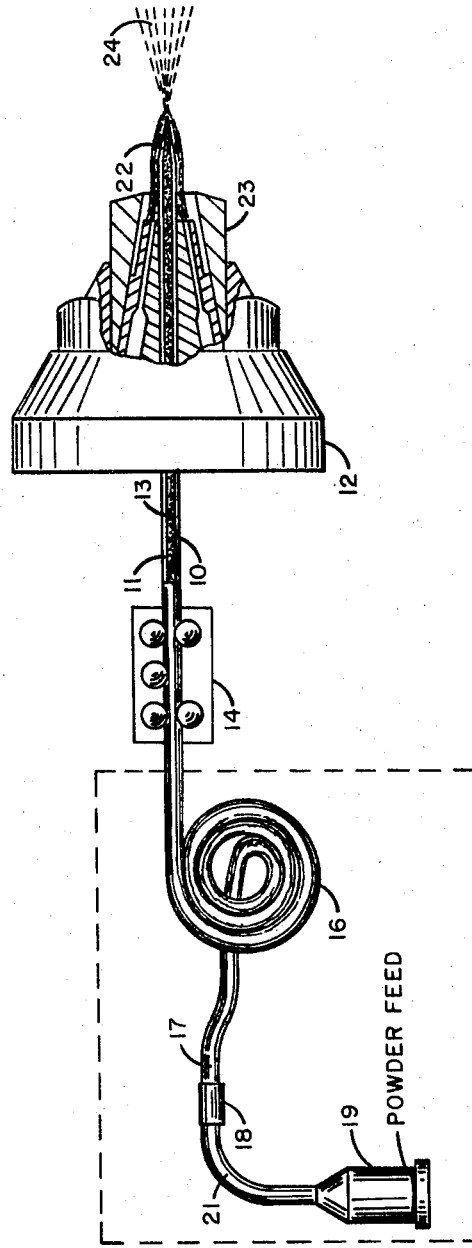

The novel features that are considered characteristic of the invention are set forth in the appended claims; the invention itself, however, both as to its organization and method of operation, together with additional objects and advantages thereof, will best be understood from the following description of a specific embodiment when read in conjunction with the accompanying drawings, in which:

FIGURE 1 is a longitudinal section of a tube containing particles flowing through the tube in a fluidized stream; and FIGURE 2 diagrammatically depicts an apparatus embodying the principles of the present invention.

Referring to the drawings, the diagrammatic representation (FIGURE 2) is depicted in a flame-spraying environment, it being understood that the process is not limited to such spraying apparatus and may be used in connection with plasma sprayers as well. The numerical symbol 10 refers to a flame-spraying wire comprising a tube 11 which has an outside diameter usually ⅛, 3/16, or ¼ of an inch, to fit a standard flame-spraying gun depicted diagrammatically at 12. The tube 11, if it has a ⅛ inch outside diameter, preferably has an inside diameter of 1/16 of an inch and is again diagrammatically shown filled with modifying particles 13. The tube 11 is fed to the flame-spray gun 12 through a wire straightener 14 from a coil 16. The end of the coil 17 is coupled through a suitable coupling 18 to a powder feed device 19. The powder feed device 19 is of a conventional construction of the type which suspends particles in a fluid, preferably air, and propels the fluidized particles through a conduit 21 through the coupling 18 to the ends 17 of the coil 16. The powders carried by the air flow through the coil 16 to the flame-spraying gun 12 and emerge from the end 22 of the tube 11 in the nozzle 23 of the flame-spray gun 12.

In a conventional manner, air, oxygen and acetylene are supplied to the nozzle. The oxygen and acetylene are ignited to melt the tube 11, and the air acts to atomize the molten portions of the tube and accelerate the molten particles to a substrate (not shown). The means for feeding the tube 11 and the sources of gas and compressed air being part of a conventional flame-spraying gun is well understood and, therefore, not shown.

The resulting atomized spray 24 contains matrix material and particles 13 supplied through the tube 11 in the manner indicated previously. Since the atomized spray 24 contains both the matrix material and the particles, a high and stable yield, and a substantially homogeneous composite coating is obtained.

FIGURE 1 is a partial sectional representation of the tube 11 filled with particles 13, diagrammatically shown flowing through the tube 11 as indicated by the arrow.

The tubes may be made from any material which the spray gun is capable of melting and atomizing. Typical materials are copper, aluminum, stainless steel, and such refractory oxides as alumina, zirconia, etc.

It is not necessary to melt the particles. Solid particles propelled to a substrate with the molten and atomized tube material are retained on the substrate by frozen tube material. In other words, the composite coating comprises particles embedded in a matrix.

Where it is desired that the composite coating comprise a wear-resistant surface, relatively hard, high melting point, inorganic particle material should be used. The particle material 13 is preferably supplied in finely divided form of about 60 to about 600 mesh. However, the largest particle size is, for all practical purposes, determined by the inner diameter of the tube and the capability of the powder feed mechanism. The aforesaid, relatively hard, high melting point material can be a refractory metal oxide such as alumina, zirconia, titanium and the like or metal carbides such as tungsten carbide, silicon carbide, titanium carbide and the like.

It is also quite obvious that particles of metal such as nickel, chilled iron, steel and the like may be used as appropriate.

It is also possible, by means of the apparatus and processes described herein, to provide particles of softer materials and metals such as nylon, tetrafluoroethylene, bronze and babbitt metal.

It is also quite obvious that the particle material 13 may comprise a mixture of two or more materials such as a metal oxide or carbide in combination with lubricants or friction modifying agents such as graphite, lead, molybdenum and sulfide particles, and the like.

It is also clear that mixtures of particles may be fed through a single powder feed such as shown in FIGURE 2 or through a plurality of powder feeds into a common conduit, in which case the feed rates of the individual powders as well as the tube may be independently controlled.

The most significant advance in the use of tubes containing fixed amounts of particles is the ability of a practitioner now to spray controlled quantities of matrix material and particle material while having independent control of the respective feed rates of the matrix and particle materials.

It is thus possible to vary the ratio of tube and particle material deposited over wide limits, viz. 100 percent tube material and no particles to 100 percent particles and no tube material.

It is also clear that the volume of particles per unit volume of tube that may be sprayed is no longer limited by the quantity of particles that can be used to fill the tube.

Through the use of the described invention, it is quite possible to vary the proportions of the respective materials during coating or in sequential coating procedures involving varying requirements. In the latter case, it will not be necessary to remove the tube stock between jobs requiring different proportions of matrix and particle material or requiring different compositions of matrix particle materials.

It is also now possible to spray a predetermined thickness of the matrix material and deposit on the matrix material a thin layer of a composite overlay in a single operation without changing tubes. Additionally, since the feed rates of the feed material and the particle material are independent of each other, it is possible to optimize the feed rates for each of these materials within broad limitations.

The various features and advantages of the invention are thought to be clear from the foregoing description. Various other features and advantages not specifically enumerated will undoubtedly occur to those versed in the art, as likewise will many variations and modifications of the preferred embodiment illustrated, all of which may be achieved without departing from the spirit and scope of the invention as defined by the following claims.

I claim:
1. A method of forming a composite coating comprising:
   feeding a tube of a meltable matrix material to a spraying apparatus adapted to melt and atomize portions of said tube;
   feeding particles of a material, independently of the feed rate of said tube, through said tube to said spraying apparatus;
   forming an atomized spray mixture of matrix material and particles; and
   simultaneously spraying said mixture on a substrate.

2. A method of forming a composite coating comprising:
   feeding a tube of a meltable matrix material to a spraying apparatus adapted to melt and atomize portions of said tube;
   feeding particles of a material suspended in a fluid, independently of the feed rate of said tube, through said tube to said spraying apparatus;
   forming an atomized spray mixture of matrix material and particles; and
   simultaneously spraying said mixture on a substrate.

3. Spray apparatus utilizing a tube of meltable matrix material having an interior longitudinal passage and at least one end and an access port into said passage spaced from said one end comprising:
   spraying means for fusing, atomizing and spraying tubing;
   means for supplying said one end to said spraying means at a position where said tubing is fused and atomized; and
   means coupled to said access port for feeding particles of a material through said passage to said one end of said tubing at a feed rate controllable independently of the feed rate of said tubing.

4. Spray apparatus as defined in claim 3 in which said access port is another end of said tubing.

References Cited

UNITED STATES PATENTS

| | | | |
|---|---|---|---|
| 2,231,247 | 2/1941 | Bleakley | 117—105 |
| 2,233,304 | 2/1941 | Bleakley | 117—105 X |
| 3,049,435 | 8/1962 | Shwayder | 117—27 X |
| 3,332,752 | 7/1967 | Batchelor et al. | 117—105.2 X |
| 3,332,753 | 7/1967 | Batchelor et al. | 117—105.2 X |
| 3,342,626 | 9/1967 | Batchelor et al. | 117—105.2 X |

WILLIAM D. MARTIN, *Primary Examiner.*

PAUL F. ATTAGUILE, *Assistant Examiner.*

U.S. Cl. X.R.

117—27, 105, 105.2; 239—83, 85; 29—191.2